United States Patent [19]
Fitzsimmons et al.

[11] Patent Number: 5,915,338
[45] Date of Patent: Jun. 29, 1999

[54] METHOD AND APPARATUS FOR LOADING TURKEYS

[75] Inventors: Bradley E. Fitzsimmons, Willmar; William R. Green, New London; James Hoglund, Hawick, all of Minn.

[73] Assignee: Hormel Foods Corporation, Austin, Minn.

[21] Appl. No.: 08/699,161

[22] Filed: Aug. 16, 1996

[51] Int. Cl.⁶ .................................................. A01K 29/00
[52] U.S. Cl. .................... 119/846; 119/843; 414/502; 414/505; 414/398; 53/244
[58] Field of Search .................... 119/843, 845, 119/846, 847, 848, 849; 53/531, 535, 245, 244, 249; 414/501, 502, 503, 504, 505, 528, 537, 527, 491, 492, 493, 519, 520, 927, 796.7

[56] References Cited

U.S. PATENT DOCUMENTS

| | | | |
|---|---|---|---|
| 3,272,182 | 9/1966 | Lund | 119/843 |
| 3,470,852 | 10/1969 | Bright | 119/843 |
| 4,365,591 | 12/1982 | Wills et al. | 119/843 X |
| 4,600,351 | 7/1986 | Nelson | 119/846 |
| 5,699,755 | 12/1997 | Wills et al. | 119/846 |
| 5,706,765 | 1/1998 | Horton | 119/846 |

FOREIGN PATENT DOCUMENTS

| | | | |
|---|---|---|---|
| 94/08451 | 4/1994 | WIPO | 119/845 |

*Primary Examiner*—Frank E. Werner
*Attorney, Agent, or Firm*—Mau & Krull, P.A.

[57] ABSTRACT

A turkey loading apparatus and method for loading turkeys includes a support structure adapted to the position at a gathering location. A conveyer conveys the turkeys to a dumping end. A loading box is operatively connected to the support structure. The loading box is moveable between a first and second position. A loading box has an exit, wherein when the exit is opened the turkeys are unloaded into the coop.

11 Claims, 15 Drawing Sheets

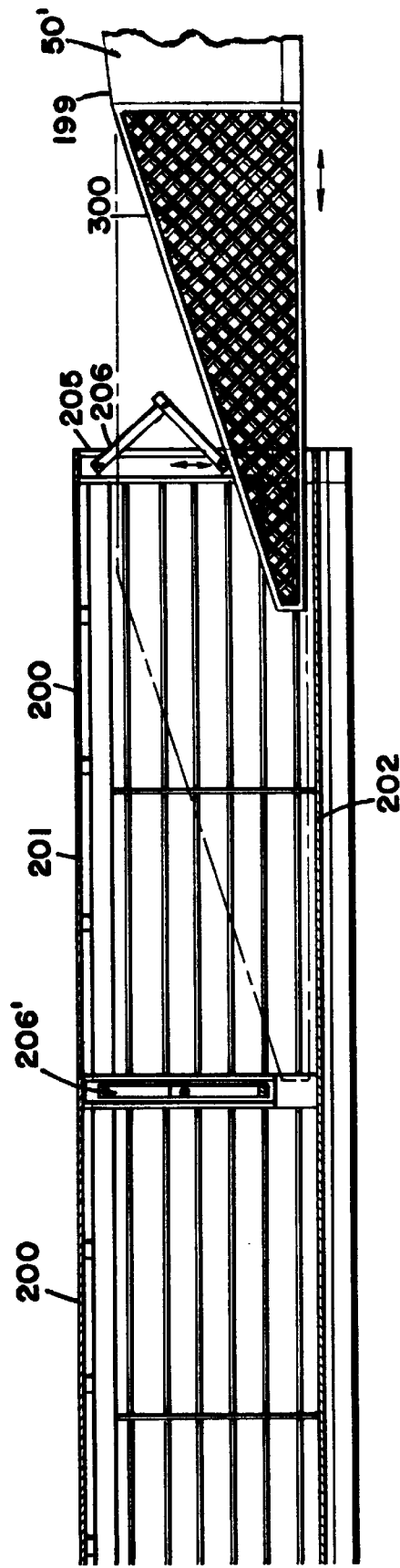

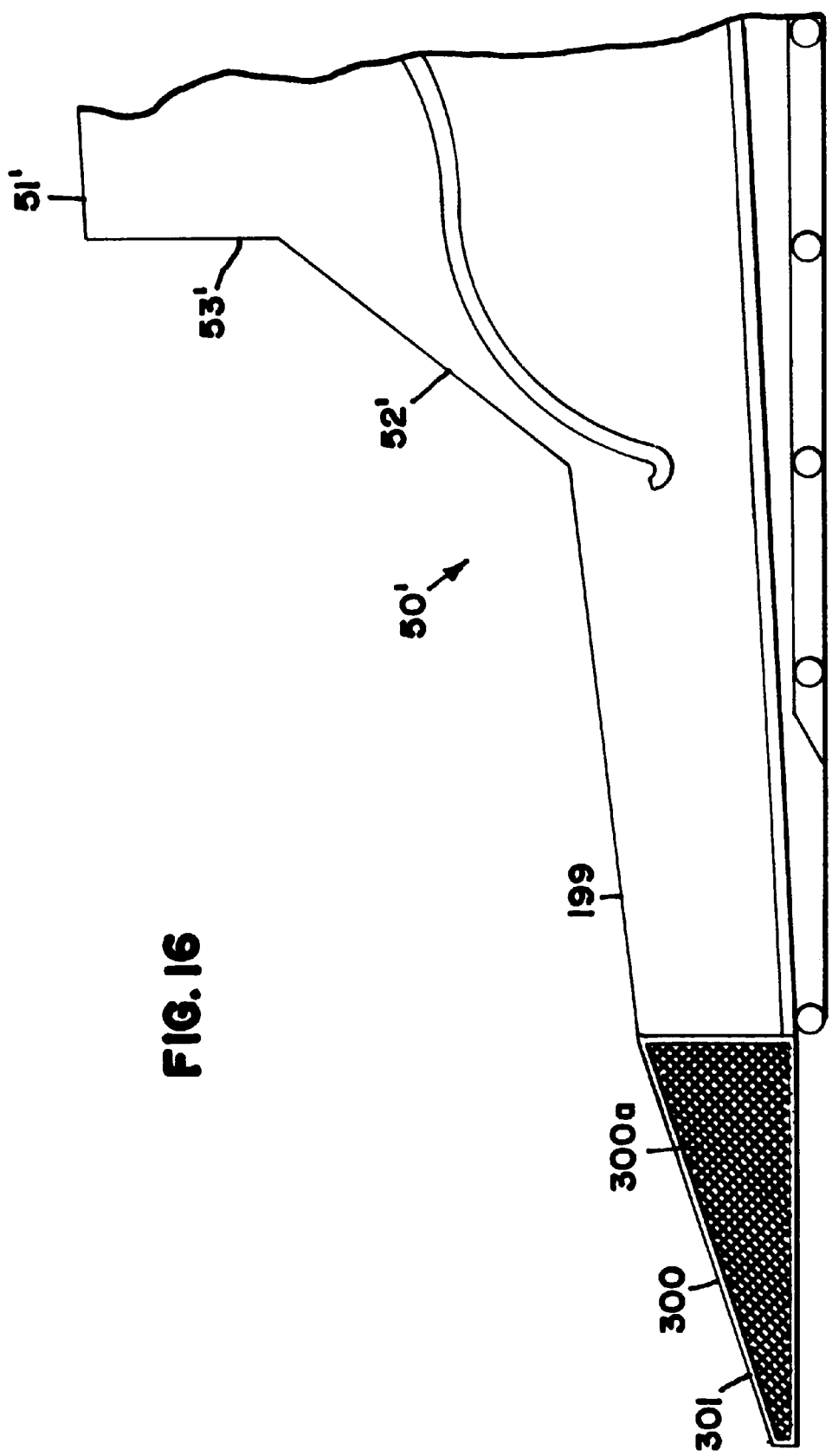

METHOD AND APPARATUS FOR LOADING TURKEYS

BACKGROUND OF THE INVENTION

1. Field of the Invention

This invention relates generally to a turkey loader apparatus and more specifically to an automated loader which does not require workers to lift the turkeys as they are being loaded into coops which are carried on trailers.

2. Description of the Prior Art

Turkey loading has typically been a very labor intensive process. The usual method of loading turkeys involves having a conveyor convey the turkeys up to a platform. There, workers will stand at the end of the conveyor on a cat walk and grab the turkeys and stuff them into the coops on a trailer. Once that coop is filled the height of the conveyor may be adjusted to fill the other coops which are positioned on top of the first coop. Then, once all those coops are filled the trailer is moved and the remaining coops on the first side of the trailer are filled in the same manner. It is then necessary that the trailer be reversed and the coops on the other side of the trailer are similarly filled. It is not possible to load from one side of the trailer because the workers that are grabbing the turkeys at the top of the conveyors are not able to place or throw the turkeys a distance of up to eight feet, the typical width of a trailer.

The handling of the turkeys by the workers also give rise to bruises on the turkeys as they are being stuffed into the coops. Less handling by humans would reduce the trauma to which the turkeys are subjected.

The problems associated with loading turkeys have increased in recent years as the size of tom turkeys have increased to the 35–40 lb range or higher. The increased weight of the turkeys not only gives rise to more trauma to the turkeys as they are loaded, there are also high injury rates to workers performing this task. In addition to a task which exposes the workers to possible injury, the task of loading a trailer of 1100 turkeys typically takes a four-man crew about 45–50 minutes to load. This is quite costly as not only does it involve four workers to load the turkeys.

The present invention addresses the problems associated with the prior art and provides for an automated turkey loader which can load turkeys without them being touched by human hands as they are loaded into the coops. Further, it is a cost effective and economical way of loading the turkeys with only a crew of one and can load the complete trailer from one side.

SUMMARY OF THE INVENTION

The present invention is a turkey loading apparatus for loading turkeys into a coop on a trailer. The apparatus includes a support structure adapted to be positioned at a gathering location. Also included is a means for conveying the turkeys. The conveying means is operatively connected to the support structure and has a gathering end and a dumping end. A loading box is operatively connected to the support structure. The loading box has an opening and the opening is positioned proximate the dumping end when the loading box is in a first position. Means for moving the loading box to a second position is provided. The loading box has an exit, wherein when the exit is open, the turkeys are unloaded into a coop in a trailer.

The present invention also is a method of loading turkeys into a coop in a trailer. The turkeys are moved from a gathering position to a dumping position. Then, the turkeys are loaded onto a supporting surface of a loading box. The loading box is then moved to a position inside of a coop on a trailer. The exit of the loading box is opened and the support surface is moved to urge the turkeys out of the loading box and into the coop.

The present invention is also a turkey loading apparatus for loading turkeys into a coop on a trailer. The apparatus includes a support structure adapted to be positioned at a gathering location. A conveyor is provided for conveying turkeys. The conveyer is operatively connected to the support structure and has a gathering end and a dumping end. A moveable loading box is provided. The moveable loading box has an entrance and an exit. Means for moving the loading box between a first and second position is also provided. A moveable surface is operatively connected to the loading box, the moveable surface adapted to support the turkeys. A means for moving the moveable surface away from the entrance and also for moving the moveable surface toward the exit is included, wherein when the loading box is in the first position, turkeys are loaded onto the moveable surface which is moving away from the entrance, thereby allowing the loading box to be filled. Then, when filled, the loading box is moved to the second position and the exit is opened and the moveable surface moves towards the exit, thereby unloading the turkeys.

The invention also includes a method for loading turkeys into coops on a trailer. The trailer has a first coop having an entrance proximate a loader and a second coop having an entrance accessible thru the first coop. The first and second coops are aligned and each coop has a door. The method includes loading turkeys from the loader into a moveable loading box. Raising the door of the first coop and the loading box is then moved to a position inside of the first coop. Raising the door of the second coop moving the loading box into a second coop. Turkeys are then unloaded into the second coop and the loading box is withdrawn from the second coop, thereby closing the door of the second coop and continuing withdrawing the loading box from the first coop. Turkeys are loaded from the loader into the loading box, the door of the first coop is raised, and the loading box is moved into the first coop. Then, the turkeys are unloaded into the first coop and the loading box is withdrawn from the first coop and the door closed.

BRIEF DESCRIPTION OF THE DRAWINGS

FIG. 14 is an end view of a turkey coop showing the opening of a gate;

FIG. 16 is a side elevational view of a second embodiment of the loading box with a gate shoe attached.

DETAILED DESCRIPTION OF THE PREFERRED EMBODIMENT

Figure 1:
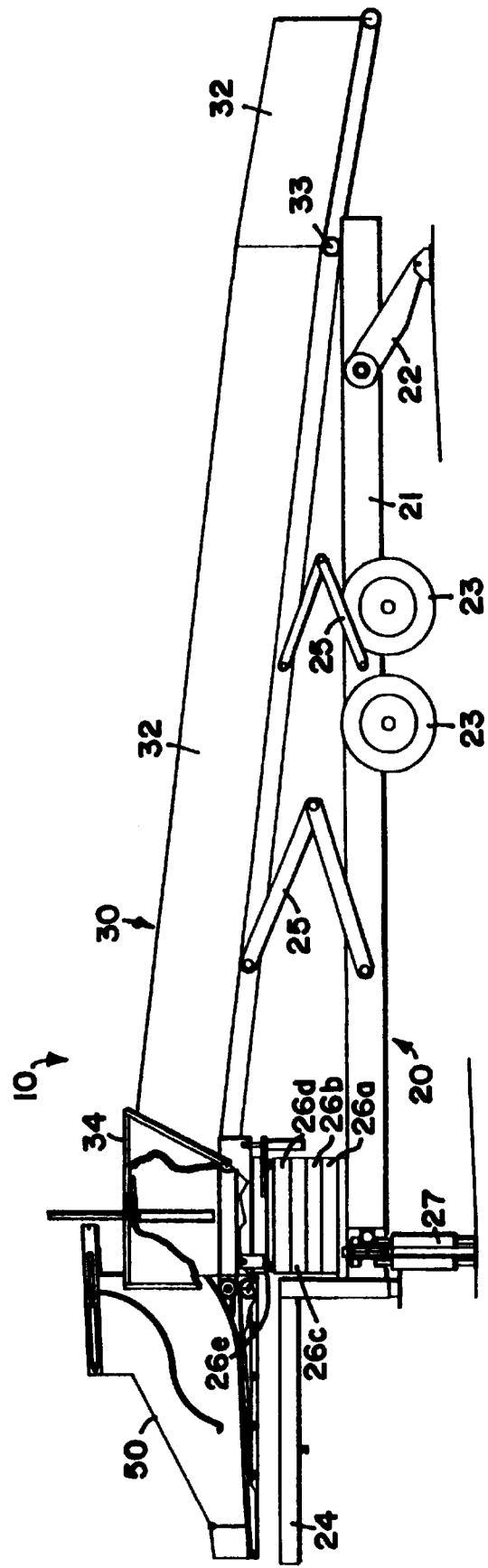
FIG. 1 is a side elevational view of the turkey loader of the present invention shown in a first level, loading position.

Referring to the drawing, wherein like numerals represent like parts throughout the several views, there is generally disclosed at 10 a turkey loading apparatus. The turkey loading apparatus 10 includes a support structure 20 for supporting a conveyer 30. The support structure 20 includes a trailer bed 21, support legs 22, wheels 23, fifth wheel hitch 24, support arms 25, a scissor jack mechanism 26 and jack support 27. Except for the jack mechanism 26, the support structure 20 is generally well known in the art. The bed 21 includes two longitudinal side rails 21a and 21b. The side rails 21a and 21b are connected by suitable cross supports 21c (only one of which is shown).

Figure 11:
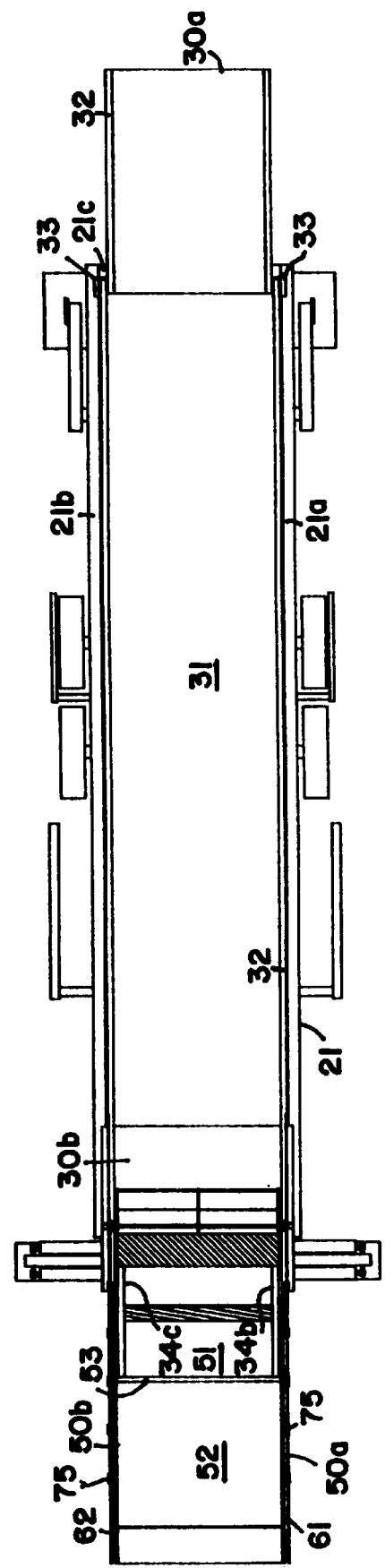
FIG. 11 is a top plan view of the turkey loader shown in FIG. 1.

As previously discussed, the conveyer 30 is supported by the support structure 20. The conveyer 30 is of a type generally well known in the industry. The conveyer 30 includes a belt conveyer 31. The belt conveyer extends from the gathering end 30a to a loading end 30b. The conveyer 31 is best shown in FIG. 11. The conveyer 30 has sides 32 to prevent turkeys from falling sideways off of the belt conveyer 31. The conveyer 30 is mounted, by means well known in the art to the rail 21 such as by rollers 33. The rollers 33 roll on top of the rails of the bed 21 as shown in FIGS. 1 and 11. Alternately, the rails of the bed 21 could have a generally C-shape and the rollers 33 would fit inside of the rails. As described, the rollers 33 support the belt conveyer at the gathering end. The dumping end is connected to a rail on top of the scissors jack as will be more fully discussed hereafter. A loading hopper 34 is positioned around the dumping end 30b. The loading hopper 34 has a top 34a and a first side 34b and a second side 34c. The ends of the hopper 34 are open to allow for the travel of turkeys into and out of the hopper.

Figure 2:
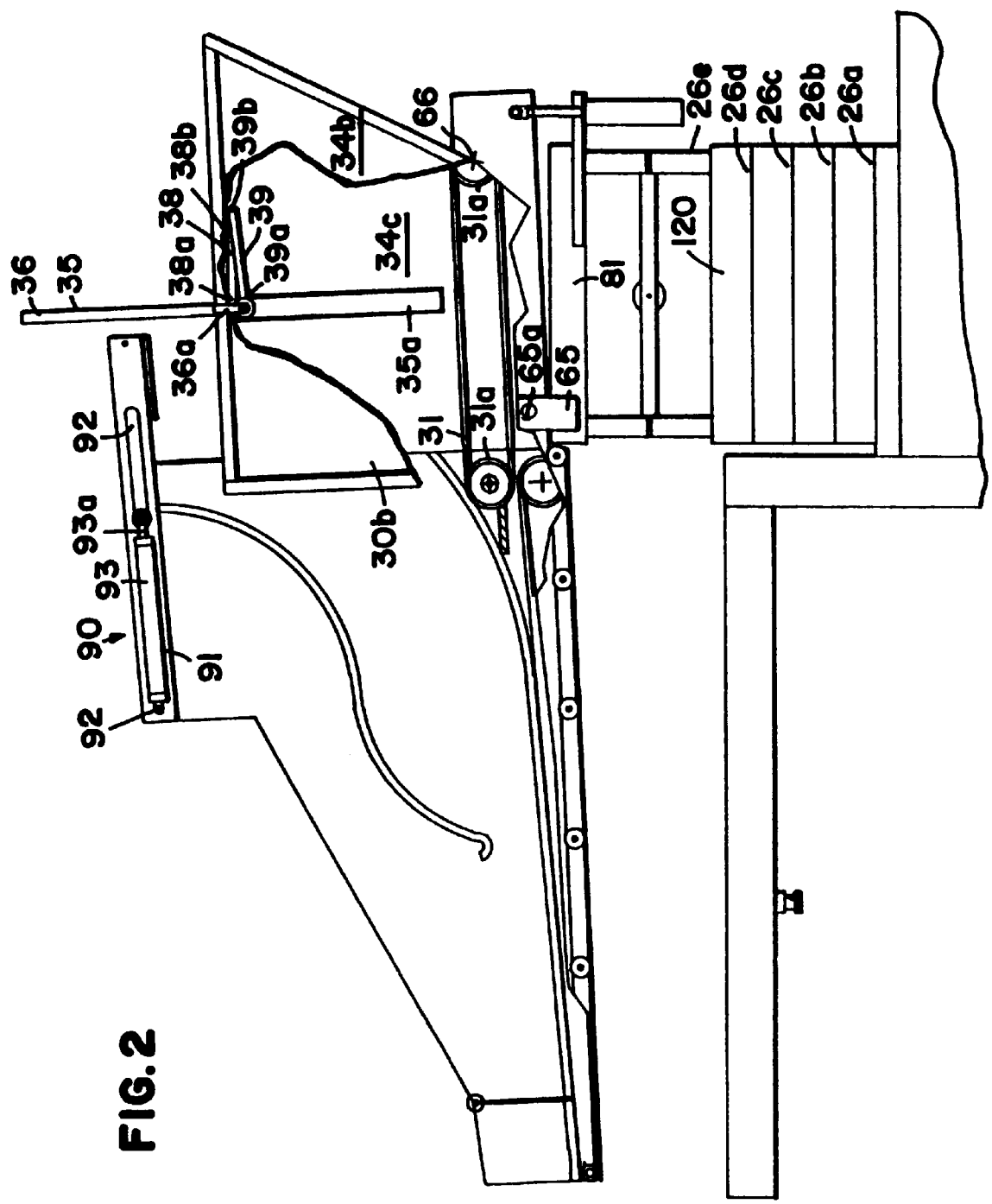
FIG. 2 is an enlarged side elevational view of a portion of the loader shown in FIG. 1, however the scissor jack mechanism is shown further expanded.
Figure 4:
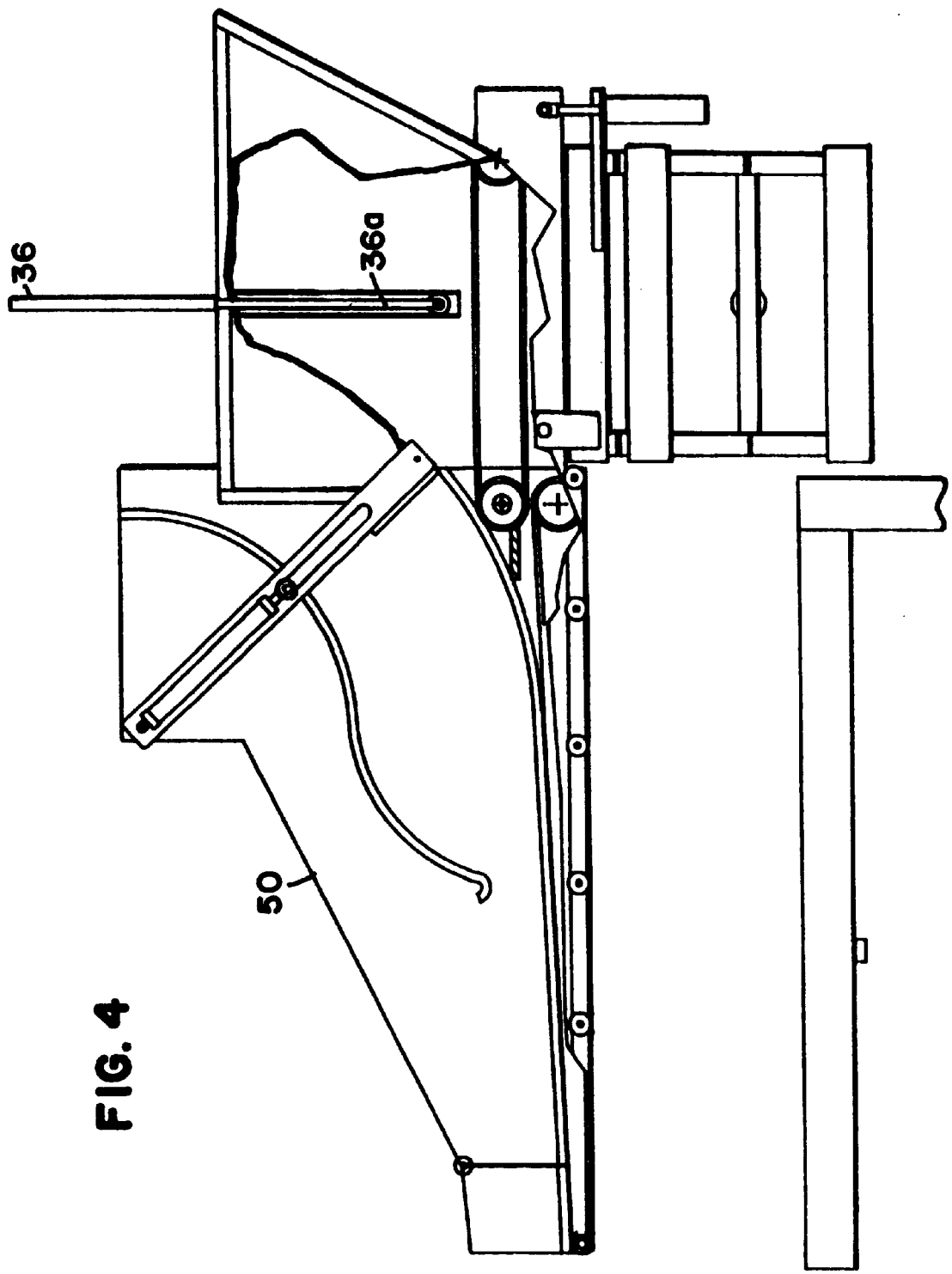
FIG. 4 is an enlarged side elevational view of a portion of the loader shown in FIG. 3.

The hopper has a hydraulically operated gate 35. The gate extends between the sides 34b and 34c. Each side has a slot 35a formed therein. The gate includes a hydraulic cylinder 36 having an extendable arm 36a. The barrier portion of the gate is formed by two generally rectangular sections 38 and 39. Section 38 has a first end 38a and a second end 38b. Similarly, the section 39 has a first end 39a and a second end 39b. The two ends 38b and 39b are pivotally connected. The first end 38a is positioned proximate the top of the hopper and the first end 39a is operatively connected to the arm 36a. FIG. 2 shows the gate in an open position. FIG. 4 shows the gate extended wherein the arm 36a has been extended downward. This then extends the two sections 38a and 38b from the folded position, as seen in FIG. 2, and extended position, as in FIG. 4. However, the gates are positioned behind the hydraulic arm 36a and therefore not seen in FIG. 4. The hydraulic cylinder 36 is actuated by means well known in the art and not shown.

The scissor jack mechanism 26 includes five scissor jacks 26a–26e. A scissor jack is shown in more detail in FIGS. 12 and 13. The scissor jack mechanism 26 includes a bottom plate 80, a top plate 81, and four intermediate plates 120. The jacks will be described with respect to jack 26b. However, it is understood that the other jacks are similar except that while jack 26b has two intermediate plates 120. The bottom jack 26a would have a bottom plate 80 and a top plate which is an intermediate plate 120. The top jack 26e has one intermediate plate 120 on its bottom and a top plate 81.

Figure 13:
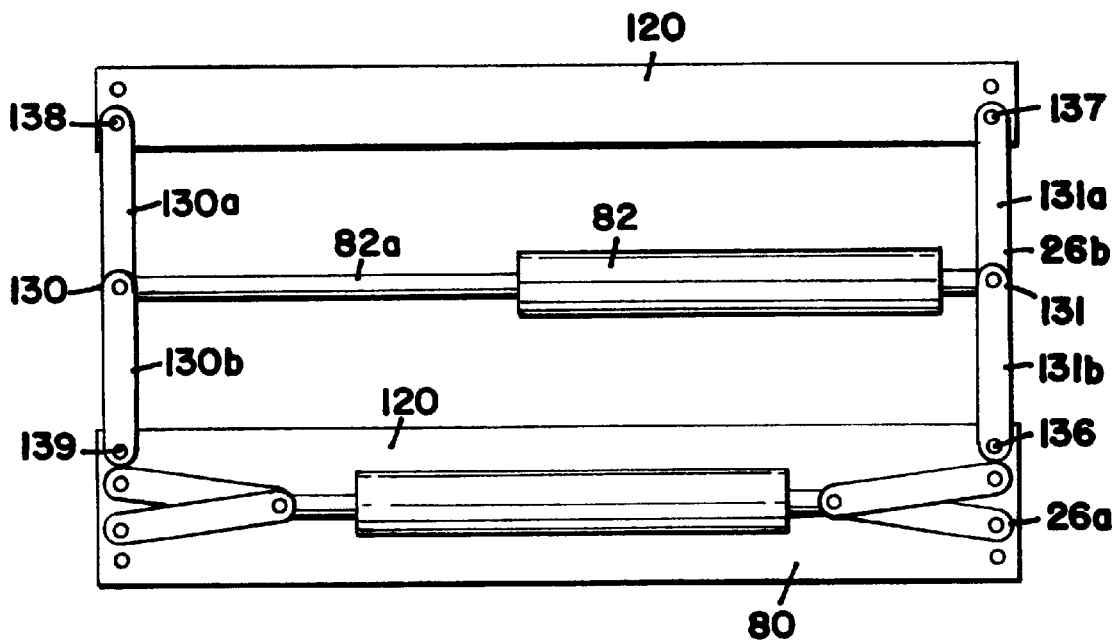
FIG. 13 is a side view of the scissor jack shown in FIG. 12.
Figure 12:
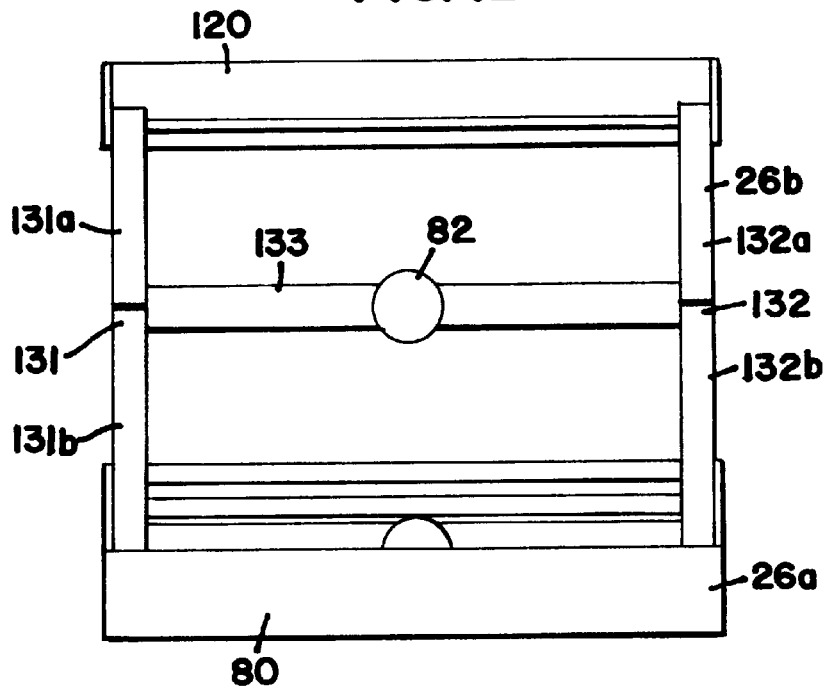
FIG. 12 is an end view of the scissor jack.

Each jack has four scissor arms 130, 131, 132 and one not shown. Scissor arms 131 and 132 will be discussed in more detail, it being understood that there is a similar set of scissor arms on the other side of the jack as shown in FIG. 12. Scissor arm 131 includes a first arm 131a and a second arm 131b pivotally connected to each other. As shown in FIG. 12, a connector member arm 133 is connected to the pivoting points of scissor arms 131 and 132. This in turn is connected to the hydraulic cylinder 82. The other ends of arm 130a is pivotally connected to the intermediate plate 120 by pin 138 and arm 130b is pivotally connected to the lower intermediate plate 120 by pin 139. Pins 137 and 136 similarly connect arms 131a and 131b to the respective plates 120. A similar connecting member is connected between the other two scissor arms and is in turn connected to the extendable arm 82a. Therefore, when the extendable arm 82a extends, it is in the position shown with respect to jack 26b in FIG. 13. When the arm retracts, it is in the position as shown in FIG. 13 for jack 26a. The scissor arms are sized so that the expansion raises the supporting structure 18 inches which is the distance between the coops on a trailer. Since this distance is standardized, it is only necessary that the four bottom jacks 26a–26d have a switch which either extends the arm fully or retracts the arm fully. It is only necessary to have a variable control for the top jack so that the first loaded coop is properly aligned.

Figure 6:
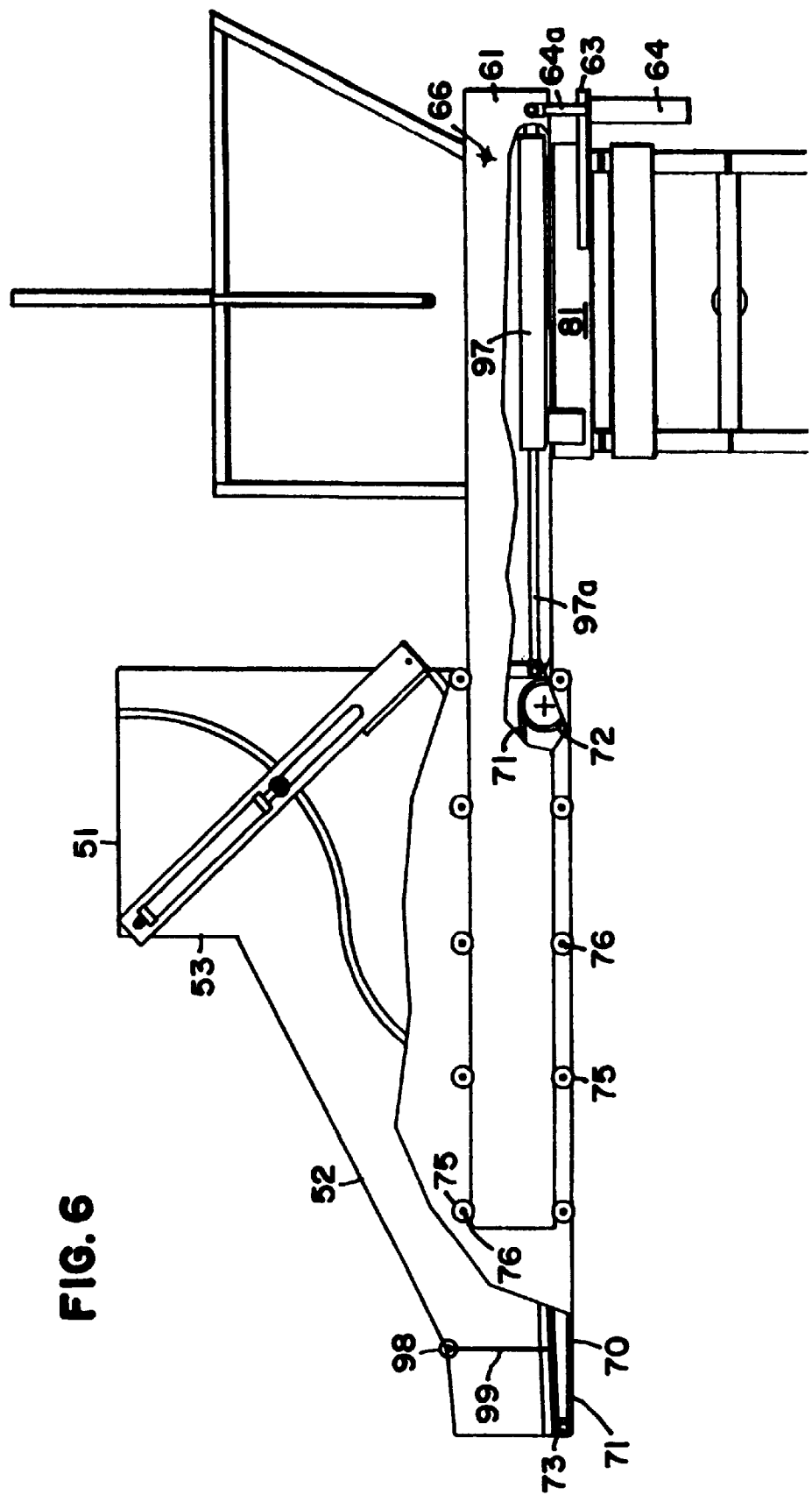
FIG. 6 is an enlarged side elevational view of a portion of the loader shown in FIG. 5.

The bottom plate of jack 26a is suitably connected to the trailer bed by means such as welding. Referring to FIG. 2, the top plate 81 is mounted to rails 61 and 62. Each rail 61 and 62 are similar and only one will be described in detail. Referring to FIG. 6, the rail 61 is seen as generally rectangular. A mounting bar 63 is welded to the top plate 81. Operatively connected to the mounting bar 63 is a hydraulic cylinder 64 having an extendable arm 64a. The extendable arm is secured to the rail 61. As shown in FIG. 2, a mounting bracket 65 is secured to the top bar 81 by suitable means such as welding. The mounting bracket 65 has an aperture through which a pin 65a is positioned. The pin 65a extends into and is secured to the rail 61. This pin 65a provides a pivot point for the rail as the hydraulic cylinder extension arm 64a is raised or lowered. The conveyer 30 is secured to the rail 61 by means of a rod 66 which is supported in rail 61 and 62 by means of a suitable bearing. This rod provides support for one of the sprockets 31a of the belt conveyer. It is understood that a suitable supporting roller (not shown) is positioned underneath the belt conveyer 31 proximate the sprocket carried by rod 66 so as to support the belt 31.

The rail 61 and 62 provide a firm support for the loading box 50. The loading box 50 has a first side 50a and a second side 50b connected by a top having a first section 51 which is connected to a sloping top section 52 by means of a downwardly depending wall 53. The bottom of the box 50 is formed by a conveyer 70 having a belt 71 mounted onto sprockets 72 and 73. The sprockets 72 and 73 are mounted on suitable bearings to the side walls 50*a* and 50 *b*. The conveyer is operated by a suitable hydraulic motor. A plurality of V-shaped rollers 75 are suitably mounted for rotation to the side walls 50*a* and 50*b* by stub axles 76. The V-shape of the rollers are adapted to fit over the width of the rails 61 and 62. The rollers 75 slidably mount the box 50 to the rails 61 and 62.

The box 50 has an open entrance proximate the hopper 34. The exit of the box 50 is closed by means of an end gate 99. The end gate 99 being operated by a suitable 90 degree hydraulic actuator 98.

A hydraulic cylinder 97 is mounted to the rail 61. The housing of the hydraulic cylinder 97 is operatively connected to the rail 61. The movable arm 97*a* of the hydraulic cylinder 97 is operatively connected to the box 50. Preferably, two hydraulic cylinders are used, one on each side with a mounting bar extending between the sides and are operatively connected to a mounting bar which extends between the sides 50 and 50*b*.

Figure 8:
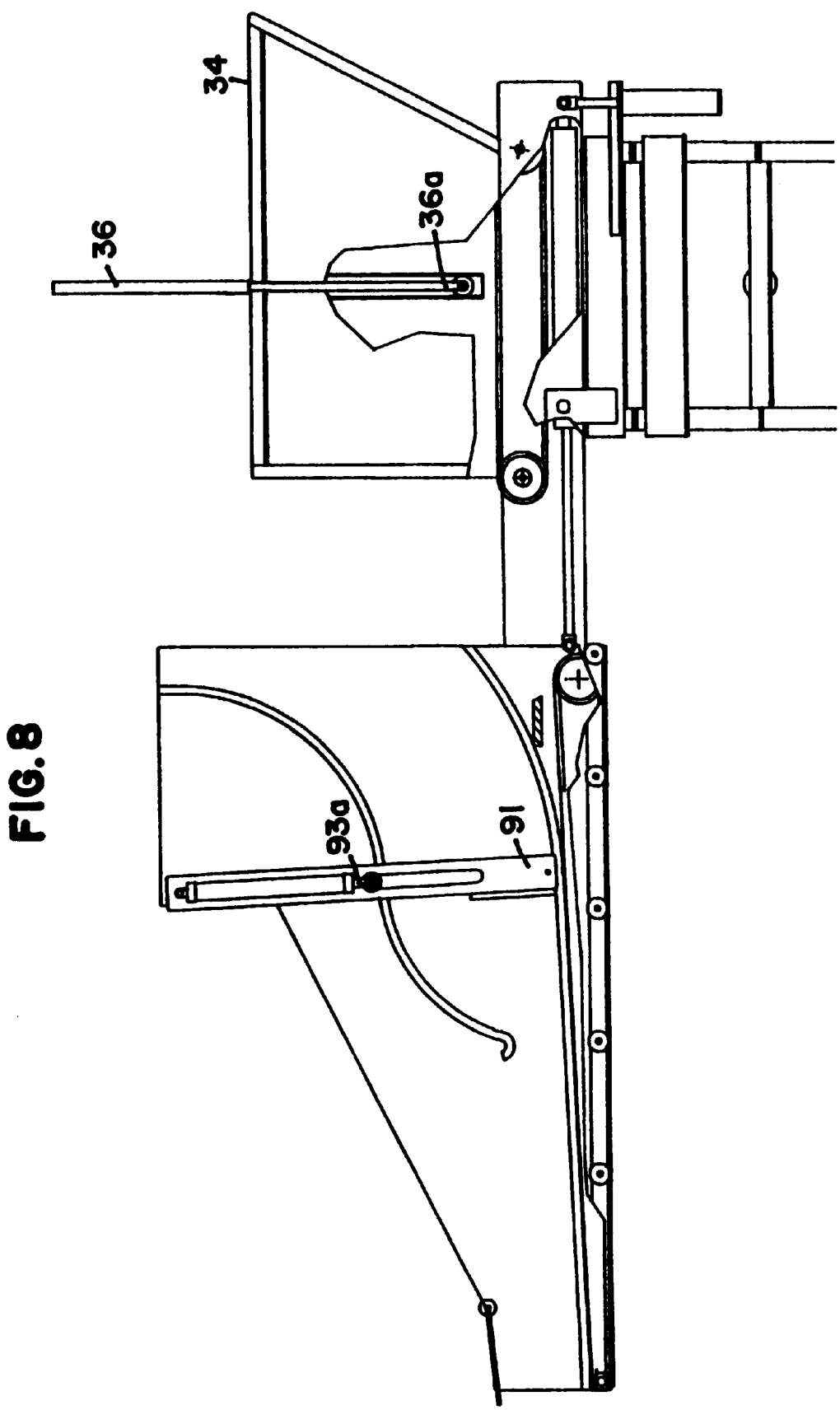
FIG. 8 is an enlarged side elevational view of a portion of the loader shown in FIG. 7.

Access to the open end of the box entrance and of the box 50 is controlled by a pushing mechanism 90. The pushing mechanism 90 includes a mounting member 91 which is pivotally attached to the inside of the side wall 50*b* by means of a pin 92. Attached to the pin 92 is a 90 degree hydraulic actuator (not shown) to rotate the member 91 to move from position shown in FIG. 2 to that shown in FIG. 4 and subsequently to that shown in FIG. 8. The member 91 has a slot 92 formed therein. Mounted to the member 91 is a hydraulic cylinder 93 having an extendable arm 93*a*. The arm 93*a* is mounted for movement within the slot 92. A scissor mechanism 94 has a first arm 95 pivotally attached to the bottom of the member 91. A second arm 96 of the scissor mechanism 94 is mounted to the end of the arm 93*a*. First guide rail 100 and second guide rail 101 are formed in the side wall 50*b*. A guide roller 102 is attached to one arm of the mechanism 94 and a second guide roller 103 is attached to the other arm of the mechanism 94. The guide roller 102 follows guide 100 and the guide roller 103 follows guide 101. A mirror image of this mechanism is also found on the inside of the side 50*a*. Attached between these two pushing mechanisms is a push plate 104. As shown in FIG. 2, the pushing mechanism 90 is in an open position. Then, in FIG. 4, the pushing mechanism has been rotated down to a position where the entrance to the box 50 has been closed. In FIG. 8, the pushing mechanism has been further rotated to an unloading position. Then, in FIG. 10, the pushing member is no longer rotated, but the arm 93*a* has been extended, thereby pushing out the scissor mechanism 94 and thereby also the push plate 104.

Figure 15:
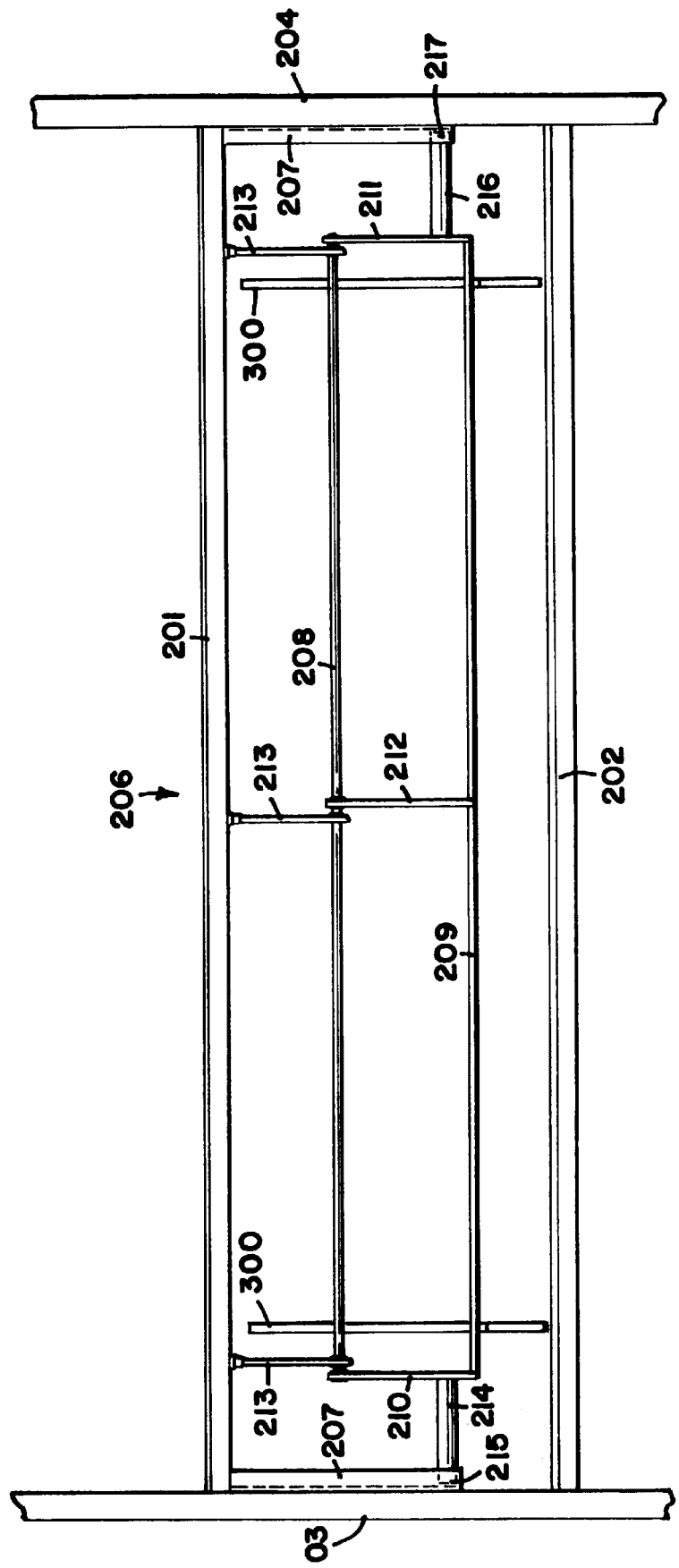
FIG. 15 is a front view of a gate of a turkey coop.

Referring to FIGS. 14–16, there is shown a second embodiment of a loading box 50'. The second embodiment of the loading box is utilized when it is desired to automate the insertion of the loading box into the turkey coops. It is well known in the art that trailers carrying turkey coops are approximately 8 feet wide and have turkey coops which are 4 feet wide. It is a standard practice to have the trailers loaded with turkeys on one side and then the trailer is turned around and turkeys are loaded from the other side. This is necessary because it is not possible for workers to throw the turkeys all the way across the width of the trailer. Further, it is necessary that the trailer have coops which do not run the whole width of the trailer so as not to overload one side of the trailer if the turkeys would move during transit. Therefore, applicants have developed a turkey coop which has a door which can be opened by the loading box 50'. Two turkey coops 200 are shown in FIG. 14. The turkey coops have a top 201 and a bottom 202. They are connected by sides 203 and 204. The tops and sides have a typical grate construction as is well known in the industry. Typically, each coop would have their own entrance gate or door which is typically raised by hand. This entrance gate is on the front 205. However, applicants have developed a gate 206 which is operable by means of a gate shoe, which will be discussed more fully hereafter. The gate 206 has channel members 207 attached to each of the sides 203 and 204. The gate has a center rod 208 attached to a bottom flat 209 by means of end plate 210, end plate 211 and center plate 212. The center rod 208 is attached to the top 201 by means of plates 213. The end plate 210 has a shaft 214 connected to it. The shaft 214 has a roller 215 attached to one end. The roller 215 rolls in the channel 207. Similarly, the end plate 211 has a shaft 216 attached to it and the shaft 216 has a roller 217 which is adapted to roll within the channel 207.

The loading box 50 is constructed to enter partway into a turkey coop which has had the gate of the turkey coop manually raised. The loading box 50 can not go significantly far into the turkey coop because of the sloping top section 52.

The loading box 50' is identical to the loading box 50 except the sloping top section 52' is at a much sharper angle so that the loading box 50' has a top which consists of a first section 51' which is connected to a sloping section 52' by means of a depending wall 53'. However, in addition there is another section 199 which is generally parallel to the conveyer in the loading box 50' so that the loading box 50' may be inserted into the turkey coop up to the sloping top 52'. The extra distance allows the loading box 50' to be inserted into the first turkey coop so that the exit of the loading box 50' may be located proximate to the opening of the second turkey coop, as will be discussed more fully hereafter. The loading box 50' has two gate pushers 300. The gate pushers 300 are located on each side of the loading box 50'. The gate pushers 300 are triangular structures having a inner mesh section 300*a*. The gate pusher 300 has a inclined top surface 301 which is used to open the gate 206. Referring to FIG. 14, it can be seen that as the loading box 50' is inserted into the first turkey coop, the gate shoes 300 contact the bottom flat 209 causing the roller and shafts 214 and 215 and 216 and 217 to rise up within the channels 207. This raises the door 206 to a fully open position when the gate shoe 300 is fully inserted into the first coop 200. If the far turkey coop 200 is being loaded, then the loading box 50' would be inserted all the way in through the first turkey coop as shown in phantom in FIG. 14. Then, further movement of the gate shoe inward would lift the second gate 206' in a manner similar to the way gate 206 was opened. Gate 206' would be the same construction as gate 206.

Figure 3:
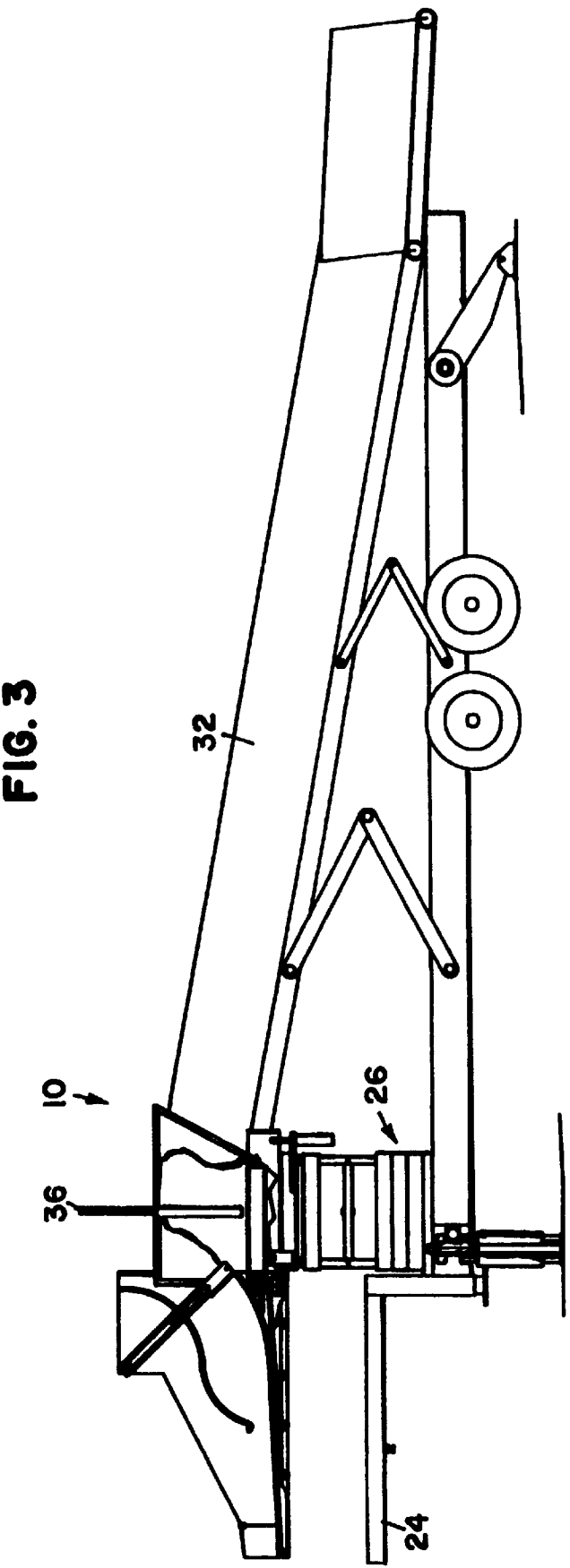
FIG. 3 is a side elevational view of the turkey loader of the present invention shown in a second level, load gate closed position.
Figure 5:
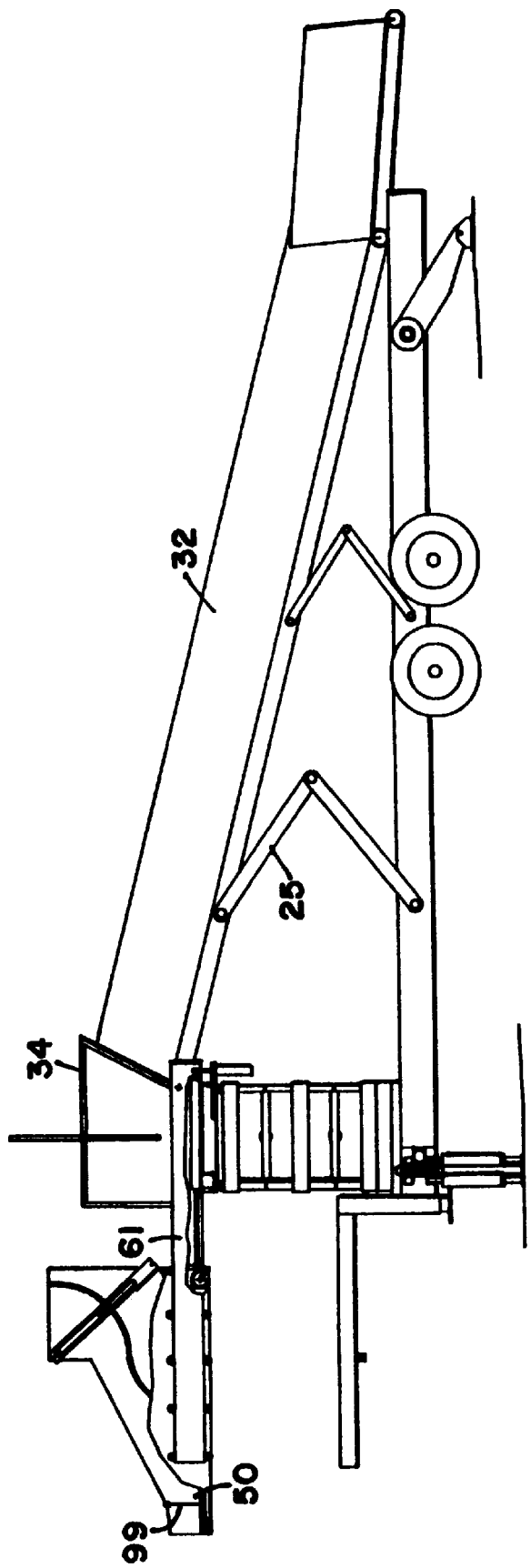
FIG. 5 is a side elevational view of the turkey loader of the present invention shown in a third level, loader extended into cage position.
Figure 7:
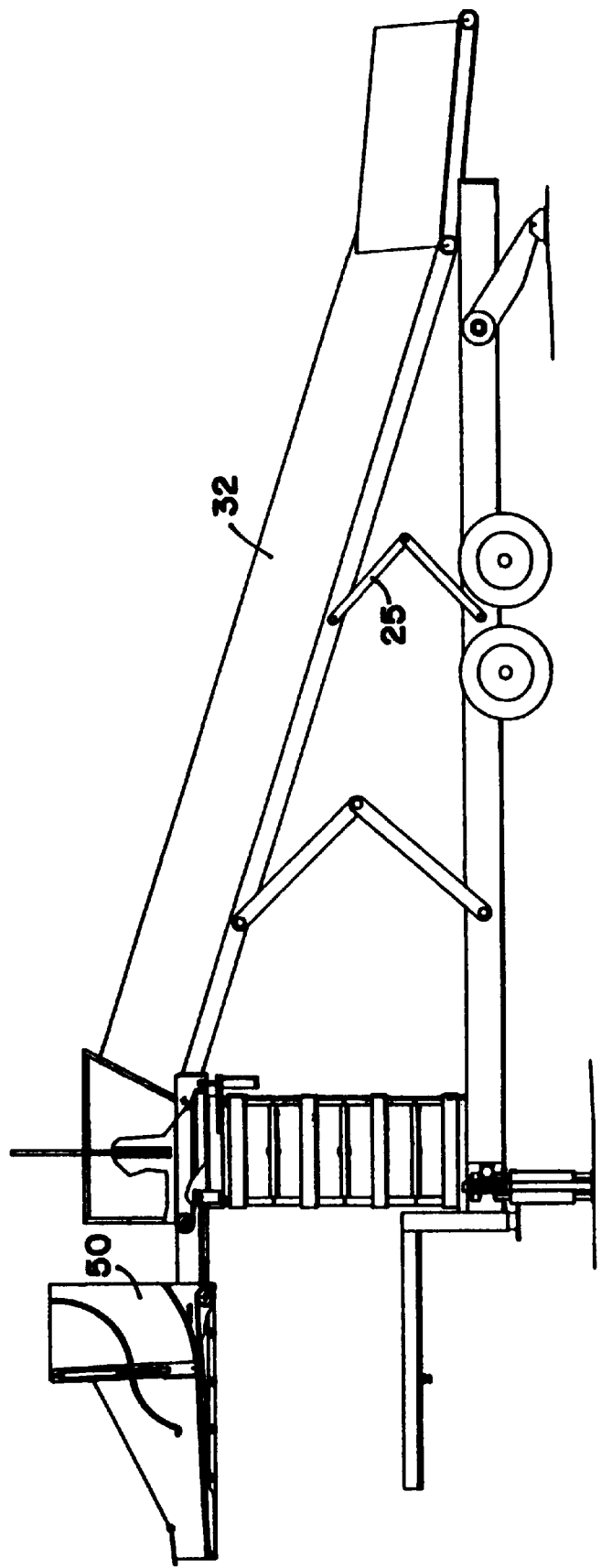
FIG. 7 is a side elevational view of the turkey loader of the present invention shown in a fourth level, end gate open and sweep arm down position.

The operation of the turkey loading apparatus 10 can be seen in sequence through the first 10 figures. FIG. 1 and 2 show the loader 10 at a first level which would correspond to the bottom level of the row of coops in a trailer. Then, FIGS. 3 and 4 sequence the loader 10 to the second level of coops and also having now closed the gate. FIGS. 5 and 6 show the loader 10 at a third level of coops but with the loader then with the box extended into a cage or coop. FIGS. 7 and 8 then progress up still another level of coops and show the box having the end gate open and the sweep arm down. Finally, in FIGS. 9 and 10, the loader 10 is shown at a fifth level of coops and having the sweep arm fully extended.

Therefore, it can be seen that the sequence of drawings actually show two different sequences. One sequence is the sequence of the loader 10 being raised up from level 1 through level 5. Another sequence shows the operation of the loader irrespective of the coop level.

Discussing first the operational sequence, it can be seen in FIG. 1 that the loader 10 is in a loading position. Another pre-load conveyer (not shown) provides an incline from the ground level to the gathering end 30a. In addition, around the pre-load conveyer there may be walls to guide the turkeys onto the conveyer. As the turkeys are positioned on the belt conveyer 31, they are carried to the dumping end 30b. Referring to FIG. 2, it can be seen that the turkeys would continue up the conveyer belt 31 and still be positioned on the conveyer belt 31 as they enter the hopper 34. At this point, the gate 35 is in an up position to allow the turkeys to proceed on belt 31. The turkeys then are moved off of the belt 31 by rotation of belt 31 and are placed onto the conveyer 70, which is operated by a hydraulic motor (not shown). The rotation of the conveyer 70 moves the turkeys further towards the exit of the box 50. Once a suitable number of turkeys have been loaded, the rotation of the belt conveyer 31 is stopped and the gate 35 is moved to its lowered position as shown in FIG. 4. The closing of the gate 35 prevents other turkeys from walking further up the conveyer belt 31. In addition, the pushing mechanism 90 is rotated downward to a closed position to close off the entrance of the box 50, thereby preventing turkeys from going out the box back into the hopper 34.

Figure 9:
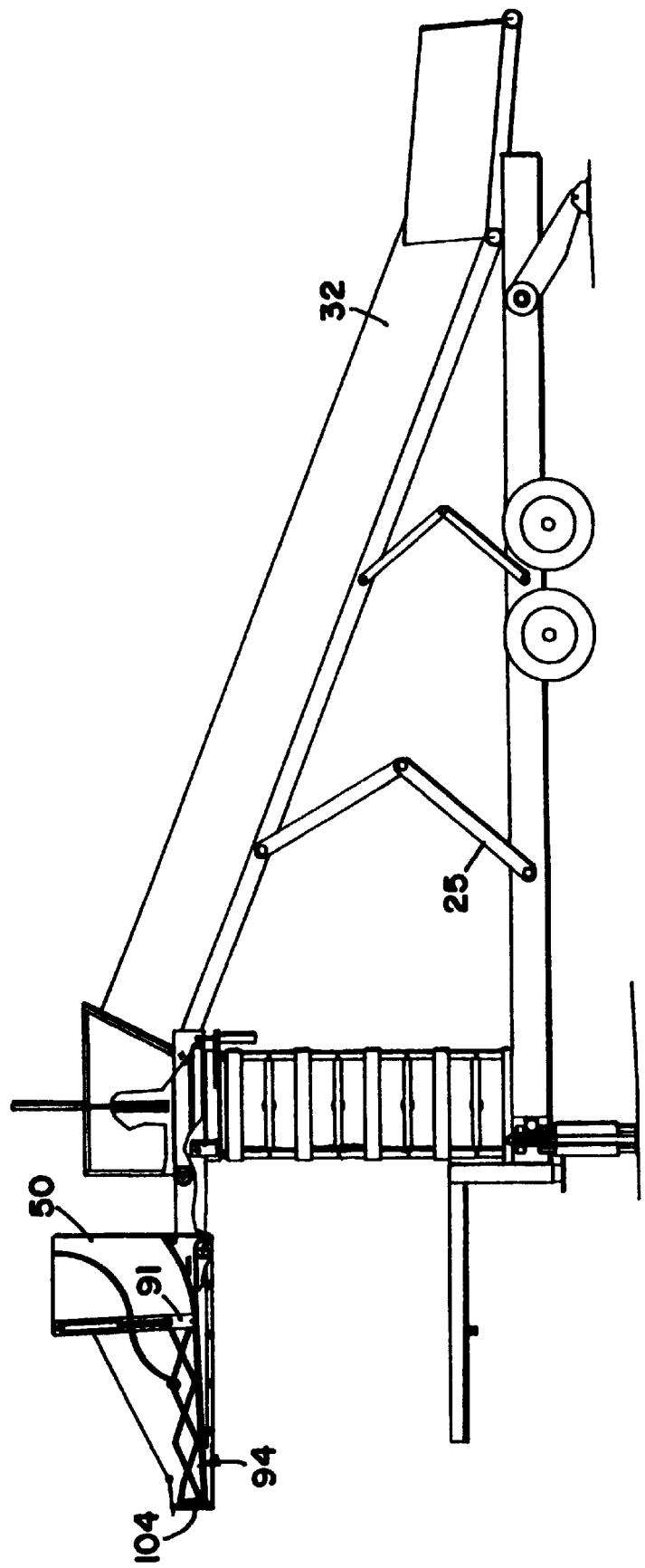
FIG. 9 is a side elevational view of the turkey loader of the present invention shown in a fifth level, sweep arm extended position.
Figure 10:
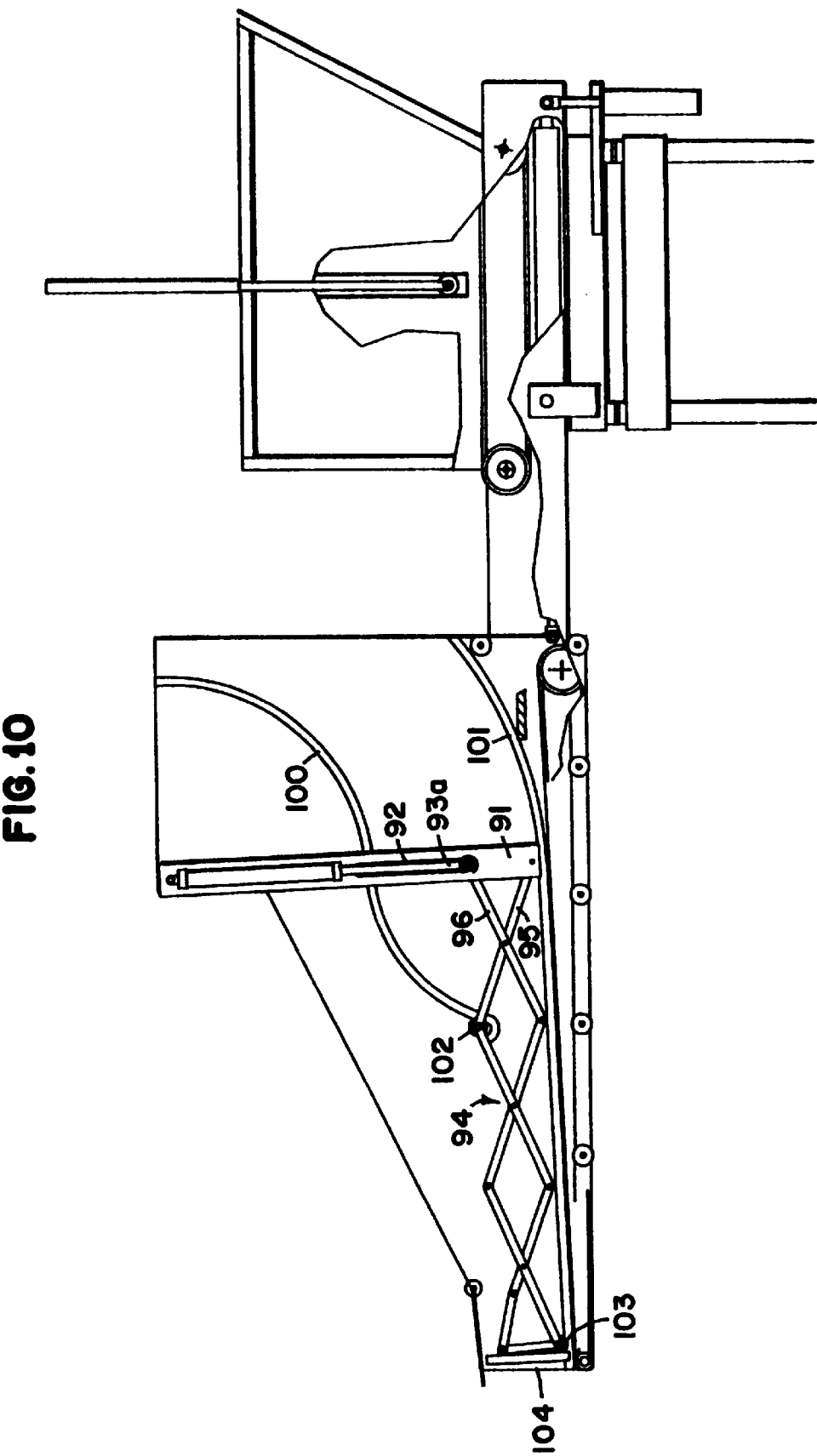
FIG. 10 is an enlarged side elevational view of a portion of the loader shown in FIG. 9.

Having now contained the turkeys in the box 50, the box 50 is extended into the cages or coops, as shown in FIGS. 5 and 6. The hydraulic cylinder 59 is actuated, thereby extending out the arm 59a which in turn pushes the box 50 into the coop. The travel of the arm 59a will depend on whether or not the first width of coops are being loaded or the second width of coops are being loaded, as will be discussed in more detail hereafter. Then, as shown in FIGS. 7 and 8, the end gate 58 is opened and the conveyer 70 is actuated to carry the turkeys out of the exit of the box 50. At that time, the pushing mechanism 90 is further rotated to the down position. Finally, as shown in FIGS. 9 and 10, the sweep arm of the pushing mechanism 90 is extended to make certain all of the turkeys have exited the box 50. It can be seen that the box 50 has a sloped surface decreasing the height from its entrance to its exit. This positions the turkeys to a lower or crouched position to provide for better conveying of the turkeys.

Referring now to FIG. 1, the turkey loading apparatus 10 is in a position to fill the first level of turkey coops on a trailer. There, the top scissor jack 26e is increased slightly to be level with the bottom of the first level of turkey coops. The scissor jack 26e has a variable lift of from 0 to 18 inches. However, the remaining jacks 26a–26d do not have a variable lift. Instead, there is a toggle switch for either having the lift activated or not. Each jack provides for an 18 inch lift. Therefore it can be seen that in FIGS. 3, 5, 7, and 9, each figure shows sequentially one additional jack being activated. The 18 inch lift provided by each jack is identical to the distance between turkey coops and a standard trailer. Therefore, by activating one of the jacks 26a–26d, the turkey loading apparatus 10 is automatically adjusted to the next level of turkey coops.

Referring to FIG. 2, one can see the tilt adjustment level available by activation of the tilt cylinder. This typically has a level adjustment of from 0–15 degrees to ensure alignment with the coop being loaded.

Previously, the operation of the turkey loader 10 having a loading box 50 has been described. If the second width of turkey coops are to be loaded from a single side, it is necessary that the loading box 50' be utilized. Then, turkeys are loaded from the loader into the moveable loading box 50'. The door 206 or the first coop 200 is raised by the gate shoe 300 and the loading box continues along the travel towards the second coop and the gate pusher 300 contacts and raises the second door 206'. The turkeys are then unloaded from the loading box 50' as previously described with respect to the loading box 50. The loading box 50' is then withdrawn from the second coop, thereby closing the door of the second coop and preventing the turkeys from exiting the second coop. The loading box 50' is continuing to be withdrawn from the first coop and the process of loading the turkeys from the loader into the loading box is repeated. Then, the loading box 50' moved on the rails toward the first coop with the gate pusher raising the door 206. At this point, the loading box 50' is just adjacent the door 206 and the turkeys are unloaded into the first coop. As the loading box 50' is withdrawn, the gate pusher 300 is also withdrawn thereby closing the door 206 of the first coop. This process is then repeated along the first level of coops of the trailer as the trailer is moved forward. One of the jacks 26 are activated raising the loader 10 18 inches and the process is repeated for the second level of turkey coops. This process is then repeated for the third, fourth, and fifth levels of turkey coops. The loader 10 has been designed for a trailer having five levels of turkey coops which is standard. However, if a trailer were to have six turkey coops, one would simply add another jack to the jack mechanism to allow for the additional levels to be loaded.

It is understood that other embodiments of the present invention may be employed. Variations which could be used would include having a loader apparatus wherein the conveyer that raises the turkeys could empty the turkeys into a box whose entrance is proximate the coops and the box extend back away from the coop. Then, the repositioning means could be rotated in a direction toward the loader so as to bring the turkeys away from the entrance and allow for additional turkeys to be filled into the box. Then, when filled, the box could be indexed into the coops. At that time, the repositioning means would reverse direction and urge the turkeys out of the exit of the box. The exit in this particular embodiment would be at the end of the box, just below the entrance into the box.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A turkey loading apparatus for loading turkeys into a coop, the coop having a top, bottom, sides and a gate to form an enclosure for turkeys, on a trailer, comprising:

(a) a support structure adapted to be positioned at a gathering location, said support structure having wheels for positioning;

(b) means for conveying turkeys, said conveying means operatively connected to said support structure and having a gathering end and a dumping end;

(c) a loading box operatively connected to said support structure, said loading box having two sides, a gate and a top all operatively connected to form an enclosure for turkeys, said loading box having an opening, said opening positioned proximate said dumping end of the conveying means when said loading box is in a first position;

(d) means for moving said loading box to a second position;

(e) a pair of rails operatively connected to the support structure;

(f) a plurality of rollers operatively connected to the box, wherein the rollers are positioned on the rails to support the box and allow relative longitudinal movement along the rails; and (g) said loading box having an exit, wherein when said exit is open the turkeys are unloaded into the coop.

2. The turkey loading apparatus of claim 1, further comprising means for repositioning the turkeys in said loading box as additional turkeys are placed in said box.

3. The turkey loading apparatus of claim 1, wherein said loading box has a loading end and a height at the loading end is greater than a height at the exit.

4. The turkey loading apparatus of claim 1, further comprising means to raise and lower the loading box and means to tilt the loading box.

5. The turkey loading apparatus of claim 4, wherein said lowering and raising means comprises a plurality of scissor jacks operatively connected to the support structure, the scissor jacks having a first, unextended position and a second, extended position.

6. The turkey loading apparatus of claim 4, wherein said tilting means comprises a hydraulic cylinder positioned between the loading box and the support structure, the hydraulic cylinder having a first, unextended position and a second extended position, wherein movement from the first position to the second position tilts the loading box.

7. The turkey loading apparatus of claim 1, wherein the moving means comprises a hydraulic cylinder operatively connected to the rails, the hydraulic cylinder having an extendable arm operatively connected to the box, wherein activation of the hydraulic cylinder moves the arm and thereby the box is a longitudinal direction along the rails.

8. The turkey loading apparatus of claim 1, wherein the reposition means comprises a belt conveyor, the belt conveyor also for providing movement of the turkeys toward the box's exit when in the second position.

9. The turkey loading apparatus of claim 8, further comprising a pushing mechanism for assisting in the unloading of turkeys when the loading box is in the second position.

10. The turkey loading apparatus of claim 9, wherein the pushing mechanism comprises:

(a) an elongate rotatable member having a first end pivotally mounted to the box, the member for rotation between first, second, and third position;

(b) an expandable pusher operably connected to the rotatable member, wherein when in the first position, the rotatable member is clear of the box's entrance, when in the second position, the rotatable member closes the box's entrance and when in the third position the expandable pusher expands and forces the turkeys out of the box's exit.

11. A turkey loading apparatus for loading turkeys into a coop on a trailer, comprising:

(a) a support structure adapted to be positioned at a gathering location, said support structure having wheels for positioning;

(b) means for conveying turkeys, said conveying means operatively connected to said support structure and having a gathering end and a dumping end;

(c) a moveable loading box, said loading box having two sides, a gate and a top all operatively connected to form an enclosure for turkeys, said loading box having an entrance and exit;

(d) means for moving the loading box between a first position and a second position;

(e) a moveable surface operatively connected to said loading box, said moveable surface adapted to support the turkeys;

(f) means for moving said moveable surface away from said entrance and also for moving said moveable surface toward said exit, wherein when said loading box is in the first position, turkeys are loaded onto said moveable surface which is moving away from said entrance, thereby allowing said loading box to be filled, then, when filled, said loading box is moved to said second position and said exit is opened and the moveable surface moves toward the exit thereby unloading the turkeys.

* * * * *